(12) United States Patent
Pilzweger

(10) Patent No.: US 10,921,238 B2
(45) Date of Patent: Feb. 16, 2021

(54) DEVICE FOR DETERMINING AT LEAST ONE COMPONENT PARAMETER OF A PLURALITY OF, PARTICULARLY ADDITIVELY MANUFACTURED, COMPONENTS

(71) Applicant: CONCEPT LASER GMBH, Lichtenfels (DE)

(72) Inventor: Florian Pilzweger, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 113 days.

(21) Appl. No.: 16/189,161

(22) Filed: Nov. 13, 2018

(65) Prior Publication Data
US 2019/0242810 A1    Aug. 8, 2019

(30) Foreign Application Priority Data
Feb. 2, 2018  (EP) .................... 18154952

(51) Int. Cl.
*G06K 9/00*  (2006.01)
*G01N 21/01*  (2006.01)
(Continued)

(52) U.S. Cl.
CPC ........... *G01N 21/01* (2013.01); *B29C 64/153* (2017.08); *B29C 64/268* (2017.08); *G01N 9/00* (2013.01);
(Continued)

(58) Field of Classification Search
CPC .. G01N 21/01; G01N 21/5907; B29C 64/153; B29C 64/268; B33Y 30/00
See application file for complete search history.

(56) References Cited

U.S. PATENT DOCUMENTS 9,670,572 B2 *  6/2017  Etter ...................... B22F 3/1055
10,421,122 B2 *  9/2019  Tsubota .................... C22C 9/00
(Continued)

FOREIGN PATENT DOCUMENTS

EP        3170590 A1    5/2017
JP     2006/220498 A    8/2006
(Continued)

OTHER PUBLICATIONS

Spierings, A.B.: "Comparison of density measurement techniques for additive manufactured metallic parts", Rapid Prototyping Journal, Aug. 2, 2011, pp. 380-386, vol. 17, No. 5, XP055495225.
(Continued)

*Primary Examiner* — Amir Alavi
(74) *Attorney, Agent, or Firm* — Dority & Manning, P.A.

(57) ABSTRACT

Device (1) for determining at least one component parameter, particularly the density and/or a density-related parameter, of a plurality of, particularly additively manufactured, components (3), the device (1) comprising:—a supporting unit (2) configured to support a plurality of components (3) whose at least one component parameter is to be determined, the supporting unit (2) comprising a supporting unit base body (4) comprising a plurality of receiving sections (5) in a defined spatial relationship, whereby at least one receiving section (5) is configured to detachably receive a component (3) whose component parameter is to be determined; one component parameter of components (3) whose at least one component parameter is to be determined being received in respective receiving sections (5) of the supporting unit (2).

11 Claims, 3 Drawing Sheets

Figure 1:
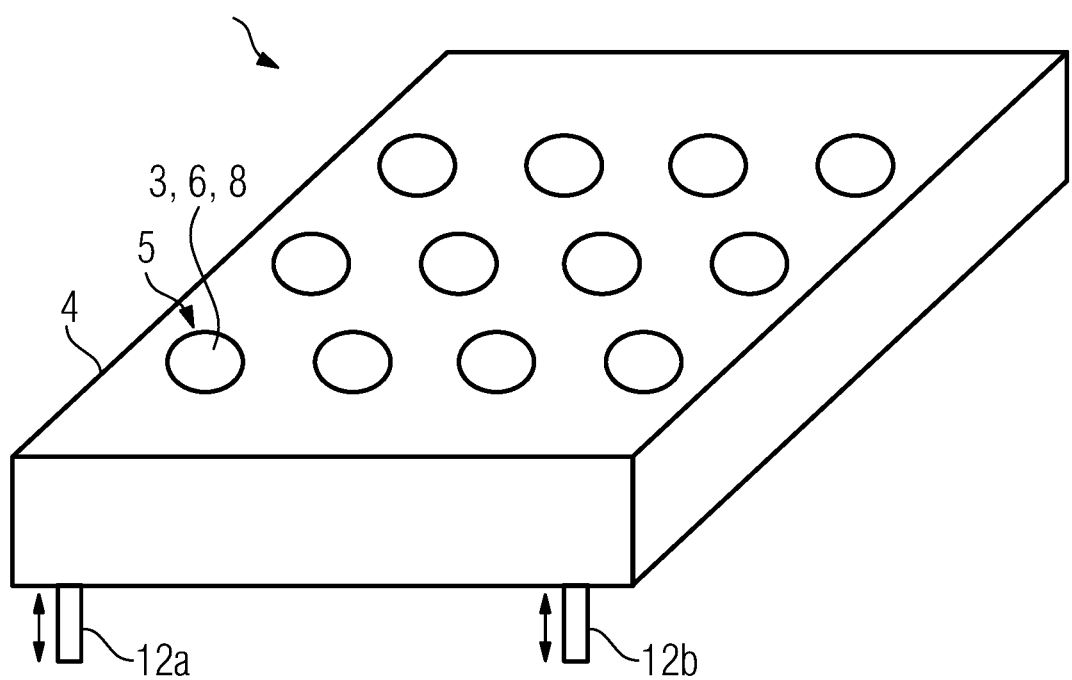

(51) Int. Cl.
*G01N 9/00* (2006.01)
*G01N 15/08* (2006.01)
*B29C 64/153* (2017.01)
*B29C 64/268* (2017.01)
*G01N 21/59* (2006.01)
*B29C 64/00* (2017.01)
*B33Y 99/00* (2015.01)
*B33Y 30/00* (2015.01)
*B33Y 40/00* (2020.01)
*B33Y 80/00* (2015.01)

(52) U.S. Cl.
CPC ....... *G01N 15/088* (2013.01); *G01N 21/5907* (2013.01); *B29C 64/00* (2017.08); *B33Y 30/00* (2014.12); *B33Y 40/00* (2014.12); *B33Y 80/00* (2014.12); *B33Y 99/00* (2014.12); *G01N 2021/0112* (2013.01)

(56) References Cited

U.S. PATENT DOCUMENTS

| | | | | |
|---|---|---|---|---|
| 2016/0114425 | A1* | 4/2016 | Liu | C03B 19/01 65/17.3 |
| 2016/0320263 | A1 | 11/2016 | Adachi | |
| 2017/0001379 | A1 | 1/2017 | Long | |
| 2017/0027624 | A1 | 2/2017 | Wilson et al. | |
| 2018/0214949 | A1* | 8/2018 | Martin | B22F 1/0018 |
| 2018/0290396 | A1* | 10/2018 | Gold | B33Y 50/02 |
| 2018/0370114 | A1* | 12/2018 | Hopkins | B29C 64/209 |
| 2019/0011187 | A1* | 1/2019 | Bucknell | F28F 1/022 |
| 2019/0242810 | A1* | 8/2019 | Pilzweger | B29C 64/268 |
| 2019/0366435 | A1* | 12/2019 | Firdosy | H01F 41/0206 |
| 2020/0108870 | A1* | 4/2020 | Cho | B62D 21/152 |
| 2020/0147685 | A1* | 5/2020 | Kremer | B22F 3/008 |

FOREIGN PATENT DOCUMENTS

| | | |
|---|---|---|
| JP | 2007/071773 A | 3/2007 |
| JP | 2008/249569 A | 10/2008 |
| JP | 2008/275597 A | 11/2008 |
| JP | 2009/198494 A | 9/2009 |
| JP | 2016/024456 A | 2/2016 |
| JP | 2017/094605 A | 6/2017 |
| WO | 2015109096 A1 | 7/2015 |
| WO | WO2015/108188 A1 | 7/2015 |
| WO | WO2015/120047 A1 | 8/2015 |
| WO | WO2015/157703 A2 | 10/2015 |
| WO | 2017129294 A1 | 8/2017 |
| WO | WO2017/195302 A1 | 11/2017 |

OTHER PUBLICATIONS

European Search Report Corresponding to Application No. 18154952 dated Jul. 30, 2018.
European Search Opinion Corresponding to Application No. 18154952 dated Aug. 6, 2018.
Machine Translated Japanese Office Action Corresponding to Application No. 2018214410 dated Dec. 13, 2019.
Machine Translated Japanese Office Action Corresponding to Application No. 2018214410 dated Oct. 12, 2020.

* cited by examiner

DEVICE FOR DETERMINING AT LEAST ONE COMPONENT PARAMETER OF A PLURALITY OF, PARTICULARLY ADDITIVELY MANUFACTURED, COMPONENTS

CROSS-REFERENCE TO RELATED APPLICATIONS

This application claims priority to European Patent Application serial no. 18 154 952.8 filed Feb. 2, 2018, the contents of which is incorporated herein by reference in its entirety as if set forth verbatim.

The invention relates to a device for determining at least one component parameter of a plurality of, particularly additively manufactured, components.

Determinations or measurements, respectively of component parameters, e.g. the density and/or density related parameters, of components are widely known in different technological fields, e.g. for assessing the structural properties, i.e. particularly the mechanical properties, of components. Particularly, in the technological field of additive manufacturing, determinations or measurements, respectively respective component parameters are important for assessing the structural properties, i.e. particularly the mechanical properties, of additively manufactured components.

By now, respective determinations or measurements, respectively of component parameters are relatively cumbersome since each component parameter determination or measurement, respectively only allows for determining or measuring component parameters of only one respective component. In other words, one determining or measuring process only allows for determining or measuring component parameters of only one respective component.

Thus, there is a need for a more efficient principle of determining or measuring, respectively respective component parameters of components. Particularly, there is a need for a more efficient principle of determining or measuring, respectively respective component parameters of components, which can be implemented in at least partly automated manner, particularly in fully automated manner.

It is the object of the invention to provide a device allowing for an efficient determination of component parameters, particularly the density and/or density-related parameters, of a plurality of, particularly additively manufactured, components in at least partly automated manner, particularly in fully automated manner.

This object is achieved by a device for determining at least one component parameter, particularly the density and/or a density-related parameter, of a plurality of, particularly additively manufactured, components according to claim 1. The claims depending on claim 1 relate to possible embodiments of the device according to claim 1.

The device described herein is a device for determining or measuring, respectively at least one component parameter of a plurality of, particularly additively manufactured, components. The device is thus, configured to determine or measure, respectively at least one respective component parameter of a plurality of, particularly additively manufactured, components.

An example of a respective component parameter may be the density of a respective component and/or a density-related parameter of a respective component. A density-related parameter may be a surface parameter, i.e. a parameter relating to the surface properties, of a respective component. A density-related parameter may also be a cavity parameter, i.e. a parameter relating to cavities, such as bubbles, blow holes, shrink holes, etc., within the (inner) volume of a respective component. A respective cavity parameter may specify the dimensions and/or location of respective cavities within the (inner) volume of a respective component. A density-related parameter may also be a porosity parameter, i.e. a parameter relating to the porosity of a respective component.

Another example of a respective component parameter may be the dimensions and/or dimensional accuracy of a respective component. Hence, a respective component parameter may also refer to dimensional tolerances of a respective component.

Further examples of respective component parameters are conceivable.

The device comprises a supporting unit configured to support a plurality of components whose at least one component parameter is to be determined. The supporting unit comprises a supporting unit base body. The supporting unit base body may be an additively built component, i.e. built by means of an additive manufacturing process, e.g. a selective electron beam melting process or a selective laser melting process. The supporting unit base body comprises a plurality of receiving sections in a defined geometric or spatial relationship; respective receiving sections may thus, be arranged in regular or irregular patterns, for instance. At least one, particularly each, receiving section is configured to detachably receive at least one component whose at least one component parameter is to be determined. Since at least one receiving section is configured to detachably receive at least one component whose at least one component parameter is to be determined, respective components can be arbitrarily inserted into the respective receiving section(s) and removed from the respective receiving section(s). By comprising a supporting unit base body having a plurality of receiving sections, the supporting unit is configured to support not only one, but a plurality of components whose at least one component parameter is to be determined, which allows for a more efficient determination of the at least one component parameter of a plurality of, particularly additively manufactured, components.

A component whose at least one at least one component parameter is to be determined may be received in a receiving body, e.g. a cast body, comprising at least one receiving section configured to receive the component. The receiving body and the component received in the receiving section of the receiving body may form a specimen which may be separately handled. A respective specimen may thus, be separately inserted into a respective receiving section and removed from a respective receiving section. A respective receiving section may thus, be configured to detachably receive at least one respective specimen. A respective receiving section may thus, be configured to directly or indirectly receive a respective component whose at least one component parameter is to be determined. In the first case, a respective component is (directly) received in the receiving section. In the latter case, a respective receiving body or specimen, respectively is (directly) received in the receiving section.

Receiving respective components or specimen in respective receiving sections of the supporting unit base body may be implemented in at least partly automated manner, particularly in fully automated manner by means of at least one handling unit, e.g. a handling robot or the like. Operation of the handling unit may be controlled by a control unit of the device. Operation of the handling unit may be controlled by a respective control unit in such a manner that an at least partly, particularly fully, automated insertion of components or specimen into respective receiving sections and/or removal of components or specimen from respective receiving sections is possible.

The device further comprises a component parameter determining unit configured to determine the component parameter(s) of components whose at least one component parameter is to be determined being received in respective receiving sections of the supporting unit. Operation of the component parameter determining unit may be implemented in at least partly automated manner, particularly in fully automated manner. Operation of the component parameter determining unit may be controlled by a control unit of the device. Operation of the component parameter determining unit may be controlled by a respective control unit in such a manner that an at least partly, particularly fully, automated determination of respective component parameters of components is possible.

During operation of the device, component parameter determinations of respective components received in respective receiving sections can be implemented successively or simultaneously in one common component parameter determination step. Hence, a device allowing for an efficient determination of at least one component parameter of a plurality of, particularly additively manufactured, components in at least partly automated manner, particularly in fully automated manner, is provided.

The supporting unit and the component parameter determining unit are arranged in a defined spatial position and/or orientation relative to each other during operation of the device. The defined spatial position and/or orientation of the supporting unit and the component parameter determining unit relative to each other allows to analyze and/or observe the components in such a manner that a determination of the at least one component parameter of the components is feasible. Typically, the component parameter determining unit is arranged opposite the supporting unit, whereby a certain clearance or gap space is built between the component parameter determining unit and the supporting unit. As will be apparent from below, the component parameter determining unit is typically arranged below the supporting unit.

The component parameter determining unit may be configured to optically determine the at least one component parameter of respective components whose at least one component parameter is to be determined. Optically determining the component parameter(s) of respective components whose at least one component parameter is to be determined typically comprises recording images of components being received in respective receiving sections of the supporting unit base body. The component parameter determining unit may thus, comprise at least one image recording unit configured to record images of components being received in respective receiving sections of the supporting unit base body, particularly images of the freely exposed surfaces of components being received in respective receiving sections of the supporting unit base body, and to provide respective image data. The image recording unit may be embodied as a camera, microscope, etc. for instance.

The image recording unit may be moveably supported relative to the supporting unit in at least one degree of freedom of motion. A respective degree of freedom of motion may be a translatory degree of freedom of motion, e.g. a translatory motion relative to a translatory axis, and/or rotatory degree of freedom of motion, e.g. a rotatory motion relative to a rotatory axis. Hence, the image recording unit may be moved to specific image recording positions in which the image recording unit is brought in a position allowing for recording images of respective components whose at least one component parameter is to be determined. When moved in a respective image recording position, the image recording unit may be in a position in which it is aligned with a respective receiving section so that recording images of components being received in the respective receiving section, particularly images of the freely exposed surface of the component being received in the respective receiving section, is feasible. Motions of the image recording unit may be implemented by a drive unit, e.g. a motor, assigned to the image recording unit allowing for an at least partly automated motion of the respective components in respective receiving sections. Operation of the drive unit may be controlled by a control unit of the device. Operation of the drive unit may be controlled by a respective control unit in such a manner that an at least partly, particularly fully, automated motion of the image recoding unit to respective image recording positions is possible.

The device may further comprise a data processing unit configured to process respective image data provided by the image recording unit so as to determine the at least one component parameter of the components. The hard- and/or software embodied data processing unit may comprise specific data processing algorithms, particularly data evaluation algorithms, allowing to deduce or derive information about the at least one component parameter of the components and/or their distribution from respective image data. Data processing or evaluating respective image data may be based on a grayscale analysis, for instance.

The supporting unit may comprise a plate-like supporting unit base body. The supporting unit base body may thus, have the shape of a plate which is easy to handle and store. The plate-like supporting unit base body may be a rectangular or disc, for instance. In either case, the plate may have a main plane. The plate-like supporting unit base body may be built with respective receiving sections. The plate-like supporting unit base body may have a plurality of, particularly bore-like, openings in a defined geometric or spatial relationship. The openings may intersect the main plane of the plate-like supporting unit base body. The openings may be defined or delimited by wall elements of the plate-like supporting unit. Each opening may build a receiving section or may be assigned to a receiving section, particularly the receiving section with which it is spatially aligned. Each opening is typically, spatially aligned with a receiving section and vice versa.

According to an exemplary embodiment, at least one receiving section may be built by a, particularly bore-like, opening in the plate-like supporting unit base body. As mentioned before, a respective opening may be defined by wall elements of the plate-like supporting unit base body. In this embodiment, the component or specimen is at least partly arranged in the main plane of the plate-like supporting unit base body. The geometry of the opening and thus, the geometry of the receiving section may be adapted to the geometry of the component or specimen which is to be received in the receiving section. The geometry of the opening and thus, the geometry of the receiving section may thus, match the geometry of the component or specimen which is to be received in the opening or receiving section, respectively allowing for a stable positioning of the component or specimen within the opening or receiving section, respectively. The component or specimen, respectively may be received within the receiving section in a custom-fit manner.

A respective opening may have at least two portions of different cross-sectional geometry. The at least two portions typically communicate with each other. A first portion has a first cross-sectional geometry and serves for supporting a respective receiving body comprising at least one receiving section configured to receive a component whose at least one component parameter is to be determined. A second or further portion has a second cross-sectional geometry and serves as a passage allowing for recording images of the component whose at least one component parameter is to be determined, particularly for recording images of the freely exposed surface of the component whose at least one component parameter is to be determined. The first portion may have a larger cross-sectional area than the second portion. The wall elements or wall element portions of the supporting unit base body defining or delimiting a respective opening may have a stepped or step-like geometry (in a cut view). In other words, the wall elements or wall element portions of the supporting unit base body defining or delimiting a respective opening may have the shape of an "L".

Alternative to the exemplary embodiment in which at least one receiving section may be built by a, particularly bore-like, opening in the plate-like supporting unit base body, at least one receiving section may also be built by wall elements, particularly vertically, extending off a (top) surface of the plate-like supporting unit base body. In this embodiment, the component or specimen is arranged on a top surface of the plate-like supporting unit base body, i.e. in a plane parallel to the main plane of the plate-like supporting unit base body. The geometry of the receiving section may also be adapted to the geometry of the component or specimen which is to be received in the receiving section. The geometry of the receiving section may thus, match the geometry of the component or specimen which is to be received in the receiving section allowing for a stable positioning of the component or specimen within the receiving section. The component or specimen, respectively may be received within the receiving section in a custom-fit manner.

In any case, the components or respective specimen, i.e. receiving bodies each comprising at least one receiving section configured to receive a component whose at least one component parameter is to be determined, may be received in the receiving sections in such a manner that a gravitational force, e.g. gravity, acts upon the components whose at least one component parameter is to be determined or the receiving bodies so as to stably support the components or receiving bodies in a defined spatial relationship relative to the component parameter determining unit. The areas, i.e. particularly the surfaces, of the components which are to be captured by the component parameter determining unit, i.e. particularly a respective image recording unit, are thus, typically oriented downwards, i.e. they typically face ground. The component parameter determining unit, i.e. particularly the image recording unit, is thus, typically arranged below the supporting unit.

The device may further comprise a setting device configured to set a defined, particularly plane-parallel, spatial position and/or orientation of the supporting unit base body relative to the component parameter determining unit. The setting device may comprise a number of setting elements, particularly setting screws, configured to co-act with the supporting unit so as to set the supporting unit in a defined spatial position and/or orientation relative to the component parameter determining unit. The setting device may particularly comprise three setting elements positioned at different positions allowing for implementing a three-point linkage or a three-point support, respectively. The setting device may be operated in at least partly, particularly fully, automated manner by a setting drive, e.g. a setting motor, being configured to move the setting elements in specific setting positions. Operation of the setting drive may be controlled by a control unit of the device.

The invention further relates to a supporting unit for a device for determining the at least one component parameter of a plurality of, particularly additively manufactured, components as specified above. All annotations relating to the device also apply to the supporting unit.

The invention further relates to an apparatus for additively manufacturing three-dimensional objects, e.g. technical components, by means of successive layerwise selective irradiation and consolidation of layers of build material which can be consolidated by means of an energy beam. The apparatus may be implemented as a selective electron beam melting apparatus or a selective laser melting apparatus, for instance. Yet, the apparatus may also be implemented as a binder jetting apparatus, particularly a metal binder jetting apparatus.

The apparatus comprises a number of functional and/or structural units which are operable during its operation. A first exemplary functional and/or structural unit is a build material application unit adapted to apply a layer of build material in a build plane of the apparatus. Another exemplary functional and/or structural unit is an irradiation unit adapted to successively selectively irradiate and consolidate respective layers of build material applied in the build plane with at least one energy beam, e.g. an electron beam or a laser beam. The apparatus comprises at least one device for determining the at least one component parameter of a plurality of, particularly additively manufactured, components as specified above.

All annotations relating to the device also apply to the apparatus.

The invention further relates to a method for determining at least one component parameter of a plurality of, particularly additively manufactured, components, particularly by means of a device for determining at least one component parameter of a plurality of, particularly additively manufactured, components as specified above. The method comprises the steps of: providing a supporting unit comprising a supporting unit base body comprising a plurality of receiving sections in a defined geometric or spatial relationship, whereby at least one, particularly each, receiving section is configured to receive at least one component whose at least one component parameter is to be determined; providing a number of components whose at least one component parameter is to be determined, i.e. at least one component whose at least one component parameter is to be determined; receiving the number of components whose at least one component parameter is to be determined in the receiving sections of the supporting unit base body; and determining the at least one component parameter of the components being received in the receiving sections by a component parameter determining unit.

All annotations relating to the device also apply to the method.

Figure 2:
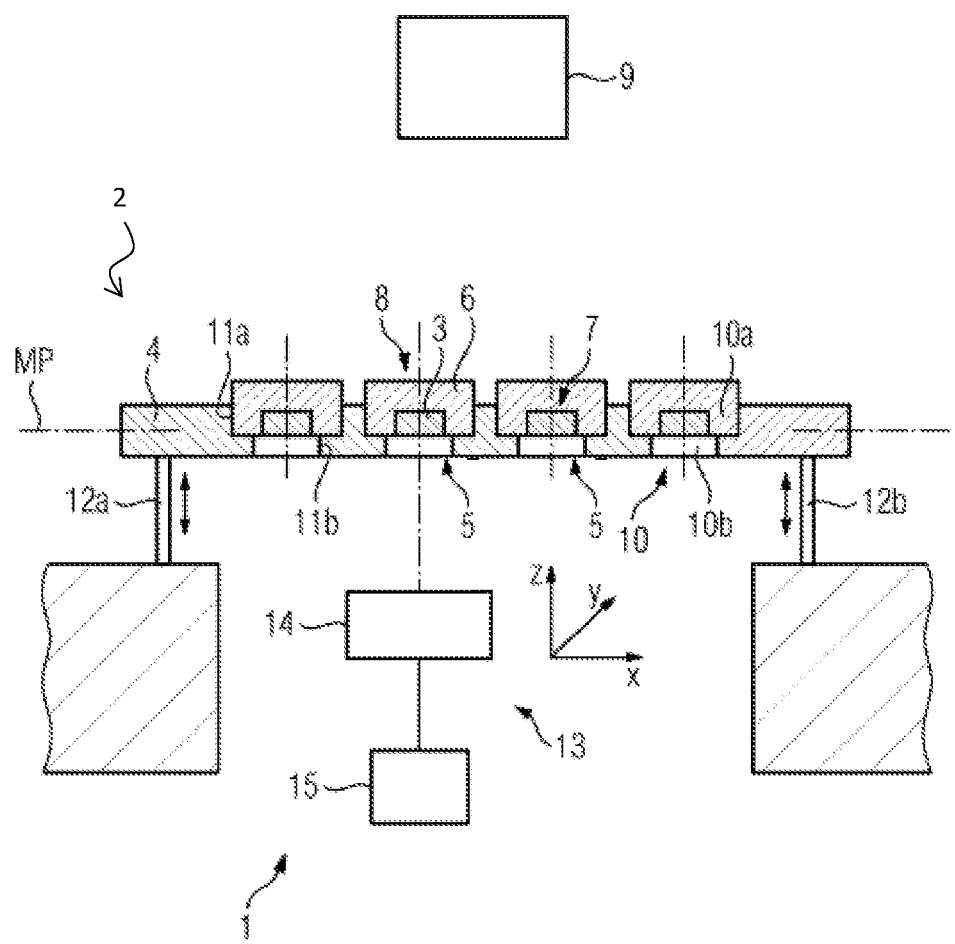

Exemplary embodiments of the invention are described with reference to the Fig., whereby:

FIG. 1 shows a principle drawing of a supporting unit for a device for determining at least one component parameter of a plurality of components according to an exemplary embodiment; and FIG. 2, 3 each show a cut-view of a device for a device for determining at least one component parameter of a plurality of components according to an exemplary embodiment.

FIG. 1 shows a principle drawing of a supporting unit 2 for a device 1 for determining at least one component parameter, e.g. the density and/or a density-related parameter, of a plurality of components 3 according to an exemplary embodiment in a perspective view.

The supporting unit 2 is configured to support a plurality of components 3 whose at least one component parameter is to be determined. The supporting unit 2 comprises a plate-like supporting unit base body 4. The plate-like supporting unit base body 4 may be an additively built component, i.e. built by means of an additive manufacturing process, e.g. a selective electron beam melting process or a selective laser melting process. The plate-like supporting base body 4 comprises a plurality of receiving sections 5 in a defined geometric or spatial relationship. Each receiving section 5—this could also apply to at least one receving section 5—is configured to detachably receive at least one component 3 whose at least one component parameter is to be determined. As is apparent from the Fig., the supporting unit 2 is configured to support not only one, but a plurality of components 3 whose at least one component parameter is to be determined.

The plate-like supporting unit base body 4 has a plurality of, particularly bore-like, openings 10 in a defined geometric or spatial relationship. The openings 10 intersect the main plane MP of the plate-like supporting unit base body 4 (see FIG. 2, 3). The openings 10 are defined or delimited by wall elements 11a, 11b of the plate-like supporting unit 4. Each opening 10 builds a receiving section 5 or may be assigned to a receiving section 5, particularly the receiving section 5 with which it is spatially aligned. Each opening 10 is spatially aligned with a receiving section 5 and vice versa.

According to the exemplary embodiments of the Fig., a respective component 3 whose at least one component parameter is to be determined is received in a receiving body 6, e.g. a cast body, comprising at least one receiving section 7 configured to receive the component 6. The receiving body 6 and the component 6 received in the receiving section 7 of the receiving body 6 forms a specimen 8 which may be separately handled. A respective specimen 8 may thus, be separately inserted into a respective receiving section 5 of the plate-like supporting unit base body 4 and removed from a respective receiving section 5 of the plate-like supporting unit base body 4. A respective receiving section 5 of the plate-like supporting unit base body 4 is thus, configured to detachably receive at least one respective specimen 8. A respective receiving section 5 of the plate-like supporting unit base body 4 is thus, configured to indirectly detachably receive at least one respective component 3. Yet, it is also conceivable that a respective component 3 is directly received in a receiving section 5 of the plate-like supporting unit base body 4.

According to the exemplary embodiment of FIG. 2, a respective receiving section 5 is built by a respective opening 10 in the plate-like supporting unit base body 4. The geometry of the opening 10 and thus, the geometry of the receiving section 5 is adapted to the geometry of the specimen 8 which is to be received in the receiving section 5. The geometry of the opening 10 and thus, the geometry of the receiving section 5 matches the geometry of the specimen 8 which is to be received in the opening 10 or receiving section 5, respectively allowing for a stable positioning of the specimen 8 within the opening 10 or receiving section 5, respectively. The specimen 8 may be received within opening 10 or receiving section 5, respectively in a custom-fit manner.

According to the exemplary embodiment of FIG. 2, a respective opening 10 has two portions 10a, 10b of different cross-sectional geometry. The two portions 10a, 10b (directly) communicate with each other. A first portion 10a has a first cross-sectional geometry and serves for supporting a respective specimen 8. A second portion 10b has a second cross-sectional geometry and serves as a passage allowing for recording images of the component 3 whose at least one component parameter is to be determined, particularly for recording images of the freely exposed surface of the component 3 whose at least one component parameter is to be determined. As is apparent from FIG. 2, the first portion 10a has a larger cross-sectional area than the second portion 10b. The wall elements 11a, 11b of the supporting unit base body 4 defining or delimiting a respective opening 10 have a stepped or step-like geometry (in a cut view). In other words, the wall elements 11a, 11b of the supporting unit base body 4 defining or delimiting a respective opening may have the shape of an "L".

Figure 3:
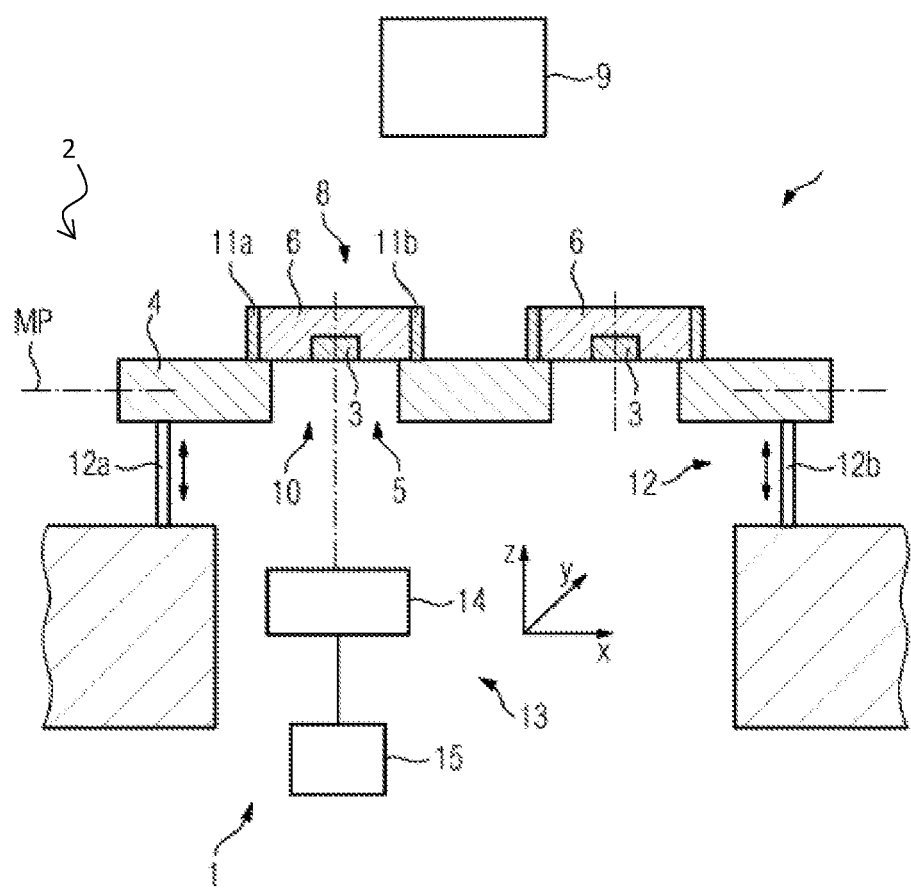

According to the embodiment of FIG. 3, respective receiving sections 5 are built by wall elements 11a, 11b (vertically) extending off a top surface of the plate-like supporting unit base body 4. As is apparent from FIG. 3, the specimens 8 are arranged on a top surface of the plate-like supporting unit base body 4, i.e. in a plane parallel to the main plane MP of the plate-like supporting unit base body 4. The geometry of the receiving sections 5 is also adapted to the geometry of the specimen 8 which is to be received in the receiving section 5. The geometry of the receiving section 5 matches the geometry of the specimen 8 which is to be received in the receiving section 5 allowing for a stable positioning of specimen 8 within the receiving section 5. The specimen 8 may be received within the receiving section 5 in a custom-fit manner.

Receiving respective specimens 8 in respective receiving sections 5 of the plate-like supporting unit base body 4 may be implemented in at least partly automated manner, particularly in fully automated manner by means of at least one handling unit (not shown), e.g. a handling robot or the like. Operation of the handling unit may be controlled by a hard- and/or software embodied control unit 9 of the device 1 (see FIG. 2, 3). Operation of the handling unit may be controlled by the control unit 9 in such a manner that an at least partly, particularly fully, automated insertion of components 3 or specimen 8 into respective receiving sections 5 and/or removal of components 3 or specimen 8 from respective receiving sections 5 is possible.

In any case, the specimen 8 are received in the receiving sections 5 in such a manner that a gravitational force, e.g. gravity, acts upon the components 3 whose at least one component parameter is to be determined so as to stably support the components 3 in a defined spatial relationship relative to a component parameter determining unit 13 of the device 1. The areas, i.e. particularly the surfaces, of the components 3 which are to be captured by the component parameter determining unit 13, i.e. particularly a respective image recording unit 14, are thus, typically oriented downwards, i.e. they typically face ground. The component parameter determining unit 13—which will be explained below in more detail—is thus, typically arranged below the supporting unit 2.

As is apparent from FIG. 2, 3, the device 1 further comprises a component parameter determining unit 13 configured to determine the at least one component parameter of components 3 whose at least one component parameter is to be determined being received in respective receiving sections 5 of the supporting unit 2. Operation of the component parameter determining unit 13 may be implemented in at least partly automated manner, particularly in fully automated manner. Operation of the component parameter determining unit 13 may be controlled by the control unit 9 of the device 1. Operation of the component parameter determining unit 13 may be controlled by the control unit 9 in such a manner that an at least partly, particularly fully, automated determination of the component parameter(s) of components 3 is possible.

As is apparent from FIG. 2, 3, the supporting unit 2 and the component parameter determining unit 13 are arranged in a defined spatial position and/or orientation relative to each other during operation of the device 1. The defined spatial position and/or orientation of the supporting unit 2 and the component parameter determining unit 13 relative to each other allows to analyze and/or observe the components 3 in such a manner that a determination of the component parameter(s) of the components 3 is feasible. As is clear from FIG. 2, 3, the component parameter determining unit 13 is arranged opposite the supporting unit 2, whereby a certain clearance or gap space is built between the component parameter determining unit 13 and the supporting unit 2.

The component parameter determining unit 13 is configured to optically determine the at least one component parameter of respective components 3 whose at least one component parameter is to be determined. Optically determining the component parameter(s) of respective components 3 whose at least one component parameter is to be determined comprises recording images of components 3. The component parameter determining unit 13 thus, comprises an image recording unit 14 configured to record images of components 3 being received in respective receiving sections 5 of the supporting unit base body 4, particularly images of the freely exposed surfaces of components 3 being received in respective receiving sections 5 of the supporting unit base body 4, and to provide respective image data. The image recording unit 14 may be embodied as a camera.

The image recording unit 14 is moveably supported relative to the supporting unit 2 in at least one degree of freedom of motion (as indicated by the arrows in FIG. 2, 3). A respective degree of freedom of motion may be a translatory degree of freedom of motion, e.g. a translatory motion relative to a translatory axis, and/or rotatory degree of freedom of motion, e.g. a rotatory motion relative to a rotatory axis. Hence, the image recording unit 14 may be moved to specific image recording positions in which the image recording unit 14 is brought in a position allowing for recording images of respective components 3 whose at least one component parameter is to be determined. When moved in a respective image recording position, the image recording unit 14 may be in a position in which it is aligned with a respective receiving section 5 so that recording images of components 3 being received in the respective receiving section 5, particularly images of the freely exposed surface of the component 5 being received in the respective receiving section 5, is feasible. Motions of the image recording unit 14 may be implemented by a drive unit (not shown), e.g. a motor, assigned to the image recording unit 14 allowing for an at least partly automated motion of the respective components 3 in respective receiving sections 5. Operation of the drive unit may be controlled by the control unit 9 of the device 1. Operation of the drive unit may be controlled by the control unit 9 in such a manner that an at least partly, particularly fully, automated motion of the image recoding unit 14 to respective image recording positions is possible.

The device 1 further comprises a data processing unit 15 configured to process respective image data provided by the image recording unit 14 so as to determine the at least one component parameter of the components 3. The hard- and/or software embodied data processing unit 15 may comprise specific data processing algorithms, particularly data evaluation algorithms, allowing to deduce or derive information about the at least one component parameter of the components 3, of the components from respective image data. Data processing or evaluating respective image data may be based on a grayscale analysis, for instance.

As is clear from the Fig., the device 1 may further comprise a setting device 12 configured to set a defined, particularly plane-parallel, spatial position and/or orientation of the supporting unit base body 4 relative to the determining unit 13. The setting device 12 may comprise a number of setting elements 12a, 12b, particularly setting screws, configured to co-act with the supporting unit 2 so as to set the supporting unit 2 in a defined spatial position and/or orientation relative to the component parameter determining unit 13. The double-arrows indicate movement of the setting elements 12a, 12b so as to set the supporting unit 2 in a defined, particularly plane-parallel, spatial position and/or orientation relative to the component parameter determining unit 13. The setting device 12 may particularly, comprise three setting elements positioned at different positions allowing for implementing a three-point linkage or a three-point support, respectively. The setting device 12 may be operated in at least partly, particularly fully, automated manner by a setting drive (not shown), e.g. a setting motor, being configured to move the setting elements in specific setting positions. Operation of the setting drive may be controlled by the control unit 9 of the device 1.

The device 1 may be assigned to an apparatus for additively manufacturing three-dimensional objects, e.g. technical components, by means of successive layerwise selective irradiation and consolidation of layers of build material which can be consolidated by means of an energy beam. The apparatus which is not shown in the Fig, may be implemented as a selective electron beam melting apparatus or a selective laser melting apparatus, for instance.

The device 1 allows for implementing a method for determining at least one component parameter of a plurality of, particularly additively manufactured, components 3. The method comprises the steps of: providing a supporting unit 2 comprising a supporting unit base body 4 comprising a plurality of receiving sections 5 in a defined geometric or spatial relationship, whereby at least one, particularly each, receiving section 5 is configured to receive at least one component 3 whose at least one component parameter is to be determined; providing a number of components 3 whose at least one component parameter is to be determined; receiving the number of components 3 whose at least one component parameter is to be determined in the receiving sections 5 of the supporting unit base body 4; and determining the at least one component parameter of the components 3 being received in the receiving sections 5 by a component parameter determining unit 13.

The invention claimed is:

1. A device for determining at least one component parameter of an additively manufactured component, the device comprising:
a supporting unit comprising a supporting unit base body comprising a plurality of receiving sections in a defined spatial relationship, wherein the plurality of receiving sections are each configured to detachably receive one of a plurality of components each having a plurality of component parameters;
  a component parameter determining unit configured to determine at least one component parameter of the component when received in a respective receiving section.

2. The device according to claim 1, wherein the component parameter determining unit comprises at least one image recording unit configured to record images of components being received in respective receiving sections of the supporting unit base body, wherein the image recording unit is moveably supported relative to the supporting unit in at least one degree of freedom of motion.

3. The device according to claim 2, further comprising a data processing unit configured to process image data provided by the image recording unit to determine the at least one component parameter of the components.

4. The device according to claim 1, wherein the supporting unit comprises a plate-like supporting unit base body comprising the respective receiving sections and a plurality of openings spatially aligned with the respective receiving sections.

5. The device according to claim 4, wherein the openings have at least two portions of different cross-sectional geometry, wherein
  a first portion comprises a first cross-sectional geometry for supporting a receiving body comprising at least one receiving section configured to receive a component whose at least one component parameter is to be determined; and
  a second portion comprising a second cross-sectional geometry serves as a passage allowing for recording images of the component whose at least one component parameter is to be determined.

6. The device according to claim 5, wherein the first portion comprises a larger cross-sectional area than the second portion.

7. The device according to claim 5, wherein the supporting unit base body comprises wall elements delimiting respective openings.

8. The device according to claim 4, wherein at least one receiving section comprises wall elements extending off a surface of the plate-like supporting unit base body.

9. The device according to claim 1, further comprising a setting device configured to set a defined spatial position and/or orientation of the supporting unit base body relative to the component parameter determining unit.

10. The device according to claim 9, wherein the setting device comprises a number of setting elements configured to co-act with the supporting unit to set the supporting unit in a defined spatial position and/or orientation relative to the component parameter determining unit.

11. The device according to claim 1, wherein the at least one component parameter is a density of the component.

* * * * *